(12) United States Patent
Spitz

(10) Patent No.: US 8,721,247 B2
(45) Date of Patent: May 13, 2014

(54) SPRING CLIP

(75) Inventor: Uwe Spitz, Rheinfelden (DE)

(73) Assignee: A. Raymond et Cie, Grenoble (FR)

(*) Notice: Subject to any disclaimer, the term of this patent is extended or adjusted under 35 U.S.C. 154(b) by 0 days.

(21) Appl. No.: 13/698,454

(22) PCT Filed: May 3, 2011

(86) PCT No.: PCT/EP2011/057060
§ 371 (c)(1),
(2), (4) Date: Nov. 16, 2012

(87) PCT Pub. No.: WO2011/144441
PCT Pub. Date: Nov. 24, 2011

(65) Prior Publication Data
US 2013/0064625 A1 Mar. 14, 2013

(30) Foreign Application Priority Data

May 20, 2010 (DE) .................... 10 2010 022 198

(51) Int. Cl.
*F16B 21/18* (2006.01)
(52) U.S. Cl.
USPC ........................ 411/516; 411/523; 411/524
(58) Field of Classification Search
USPC ............... 411/133, 516, 520, 523, 524, 352
See application file for complete search history.

(56) References Cited

U.S. PATENT DOCUMENTS

| 2,286,042 | A | * | 6/1942 | Tinnerman | 411/523 |
| 3,123,880 | A | * | 3/1964 | Tinnerman | 411/352 |
| 3,414,035 | A | * | 12/1968 | Munse | 411/175 |
| 4,385,858 | A | * | 5/1983 | Bell | 411/112 |
| 4,714,392 | A | * | 12/1987 | Muller et al. | 411/175 |
| 2006/0245843 | A1 | * | 11/2006 | Yoneoka | 411/433 |

FOREIGN PATENT DOCUMENTS

| EP | 1182369 A2 | 2/2002 |
| JP | 11-159516 A | 6/1999 |

OTHER PUBLICATIONS

IPRP and Annexes and English translation of same related to parent application No. PCT/EP2011/057060.
International Search Report related to parent application No. PCT/EP2011/057060.

* cited by examiner

*Primary Examiner* — Roberta Delisle
(74) *Attorney, Agent, or Firm* — Faegre Baker Daniels LLP

(57) ABSTRACT

A spring clip includes two articulated legs having engagement tongues for engagement with an external thread of a threaded shank, and at least one spring leg extending away from a base plate and arranged on a side of the base plate opposite the articulated legs. Engagement of the engagement tongues with the external thread is improved by the spring force exerted by the spring legs. Manipulation tongues are provided for assembly and disassembly of the spring clip, and ensure torque-free handling of the spring clip.

19 Claims, 3 Drawing Sheets

SPRING CLIP

CROSS-REFERENCE TO RELATED APPLICATION

This application is a U.S. National Phase Patent Application based on International Application No. PCT/EP2011/057060 filed May 3, 2011, which claims priority to German Patent Application No. 10 2010 022 198.8 filed May 20, 2010, the entire disclosures of which are hereby explicitly incorporated by reference herein.

BACKGROUND OF THE INVENTION

1. Field of the Invention

The invention is directed to a spring clip.

2. Description of the Related Art

One spring clip is known from EP 1 182 369 A2. The prior spring clip of this kind, for attachment to a threaded shank provided with an external thread, comprises a base plate and two articulated legs joined to the base plate. Each articulated leg is configured with an engaging tongue configured to engage with an external thread of a threaded shank. Joined to the base plate, in the spring clip of the type in question, are three spring legs that extend, resiliently with respect to the base plate, on the opposite side of the base plate from the articulated legs. In this way, when the spring legs deflect, the engaging tongues are pressed into the thread turns of the external thread of a threaded shank onto which the spring clip is pressed, the spring legs coming into abutment on a support plate.

Another spring clip is known from JP 11-159516 A. This prior spring clip, which is intended for attachment to a threaded shank provided with an external thread, comprises a base plate and two articulated legs joined to the base plate. Each articulated leg carries an engaging tongue, for engagement with an external thread of a threaded shank, and a manipulating tongue for at least loosening or for releasing the engagement of the engaging tongue with the external thread of a threaded shank. The manipulating tongues are oriented obliquely to a diagonal passing through a through-opening.

SUMMARY OF THE INVENTION

The present invention provides a spring clip that is distinguished by very reliable retention on a threaded shank provided with an external thread and is relatively easy to release from the threaded shank.

By virtue of the fact that in the spring clip according to the invention, the manipulating tongues are so oriented parallel to each other and parallel to a surface tangent to a through-opening and are so disposed diagonally opposite each other that a linear movement free of transverse forces and thus free of torque is obtained, the spring clip can be loosened or released and pulled off a threaded shank without the risk of it rotating in response to manually applied pressing forces.

In one form thereof, the present invention provides a spring clip for attachment to a threaded shank provided with an external thread, including a base plate and, joined to the base plate, two articulated legs, each of which carries an engaging tongue, for engagement with an external thread of a threaded shank, wherein joined to the base plate is at least one spring leg that extends, resiliently with respect to the base plate, on the opposite side of the base plate from the articulated legs characterized in that each articulated leg carries a manipulating tongue for at least loosening or for releasing the engagement of the engaging tongue with an external thread of a threaded shank, in that joined to the free end of each articulated leg is a manipulating tongue angled with respect to the articulated leg and extending toward the base plate, and in that the manipulating tongues are so oriented parallel to each other and parallel to a surface tangent to a through-opening and are so disposed diagonally opposite each other that a linear movement free of transverse forces and thus free of torque is obtained.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
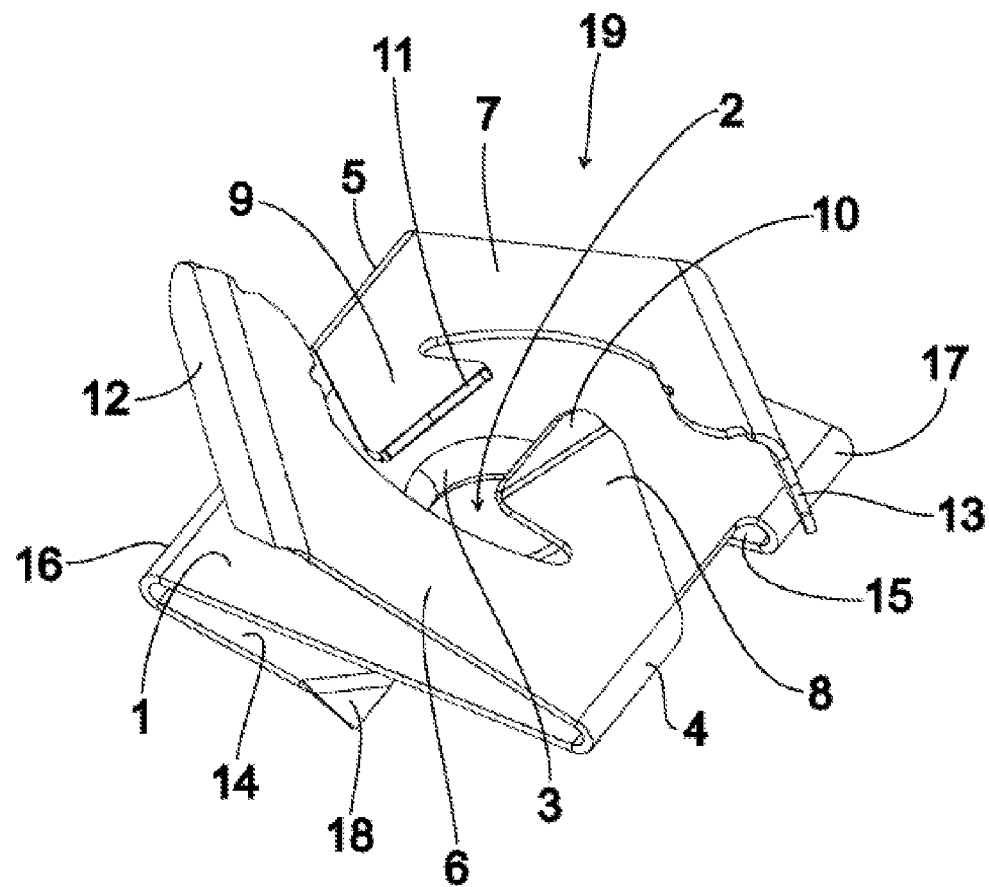
FIG. 1 is a perspective view of an exemplary embodiment of a spring clip according to the invention.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a spring clip according to the invention, made from a flat metal strip in a stamping and bending process. The exemplary embodiment of the inventive spring clip comprises a substantially square base plate 1, in the center of which a roundish through-opening 2 is surrounded by a guide sleeve 3 extending away from the base plate 1 toward a mounting side.

Joined to two opposite connection edge sides of the base plate 1, via two diagonally oppositely disposed bent-around portions 4, 5, are two articulated legs 6, 7 that extend obliquely away from the base plate 1 toward the opposite connection edge side. Extending from each articulated leg 6, 7 toward the center of the base plate 1 is a respective engaging arm 8, 9, to whose end facing away from the respective articulated leg 6, 7 is joined an engaging tongue 10, 11 that is angled away from the base plate 1 with respect to the particular engaging arm 8, 9.

The engaging tongues 10, 11 are configured as wedge-shaped, with the slanting surfaces pointing toward the articulated leg 6, 7 to which the particular engaging tongue 10, 11 is connected.

Formed at the free end of each articulated leg 6, 7 is a manipulating tongue 12, 13 angled approximately perpendicularly to the respective articulated leg 6, 7 and extending toward the base plate 1. The manipulating tongues 12, 13 are oriented parallel to each other and to a surface tangent to the through-opening 2, and are disposed diagonally directly opposite each other with respect to the through-opening 2.

The exemplary embodiment of a spring clip according to the invention depicted in FIG. 1 also comprises two spring legs 14, 15, each of which is connected to the base plate 1 via a respective bent-around portion 16, 17 in the opposite corner regions from the bent-around portions 4, 5 by which the articulated legs 6, 7 are connected to the base plate 1. On the opposite side of the base plate 1 from the articulated legs 6, 7, the spring legs 14, 15 extend away from the base plate 1 toward the opposite connection edge side, approximately as far as the center of the base plate 1. Each spring leg 14, 15 has at its free end facing away from the particular bent-around portion 16, 17 a claw tongue 18, 19, disposed externally and having a point-like shape, which is bent away from the base plate 1 with respect to the particular spring leg 14, 15.

Figure 2:
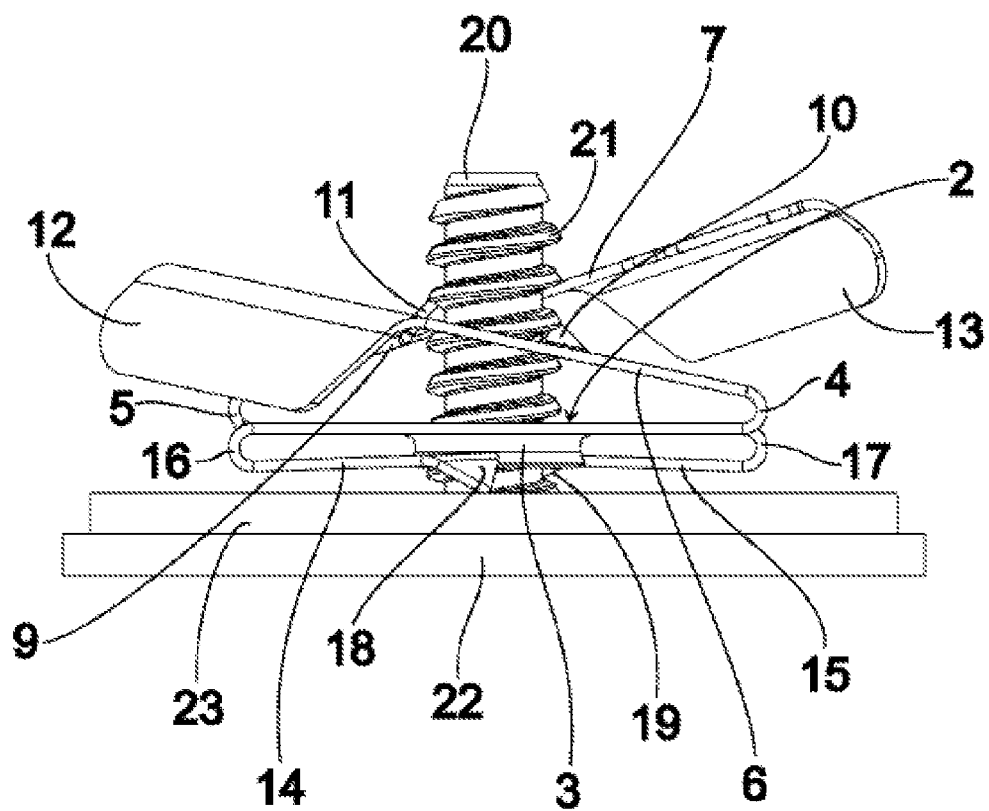
FIG. 2 is a side view of the exemplary embodiment according to FIG. 1 in an arrangement in which it is clipped to a threaded shank and is in abutment with an abutment surface.

FIG. 2 is a side view of the exemplary embodiment of a spring clip according to the invention as depicted in FIG. 1, in an arrangement where it is inserted onto a threaded shank 20, said threaded shank 20 having an external thread 21 and being fixedly connected to a support part 22 to which an add-on part 23 is to be attached by means of the spring clip according to the invention. In the arrangement of FIG. 2, the spring clip according to the invention is inserted over the external thread 21 by pressing the manipulating tongues 12, 13 together or alternatively by pressing, for instance with the thumb and forefinger, on the side of the articulated legs 6, 7 facing away from the base plate 1, or on the base plate 1, until the claw tongues 18, 19 come into abutment with, as an abutment surface, the side of the add-on part 23 facing away from the support part 22, the spring legs 14, 15 being pressed toward the base plate 1. Once the manipulating tongues 12, 13 are released, the engaging tongues 10, 11 snap into the external thread 21 and thereby secure the add-on part 23 to the support part 22 against movement in the axial direction, while the claw tongues 18, 19 prevent or at least inhibit rotation.

The guide sleeve 3 simultaneously facilitates the passage of the threaded shank 20 through the through-opening 2. In the exemplary embodiment according to FIG. 1, the guide sleeve 3 is configured as relatively short in comparison to the spring travel of the spring legs 14, 15, thus enabling the spring legs 14, 15 to deflect relatively far toward the base plate 1. High retaining force of the spring clip on the threaded shank 20 is achieved in this way.

To release the engagement of the engaging tongues 10, 11 with the external thread 21, the manipulating tongues 12, 13 are moved back toward each other, the linear movement obtained being free of transverse forces, and therefore torque-free, owing to the arrangement of the manipulating tongues 12, 13 parallel to each other and to the tangential surface and diagonally opposite each other, such that once the engagement of the engaging tongues 10, 11 with the external thread 21 is released, the spring clip according to the invention can be pulled away from the add-on part 23 and off the threaded shank 20.

Figure 3:
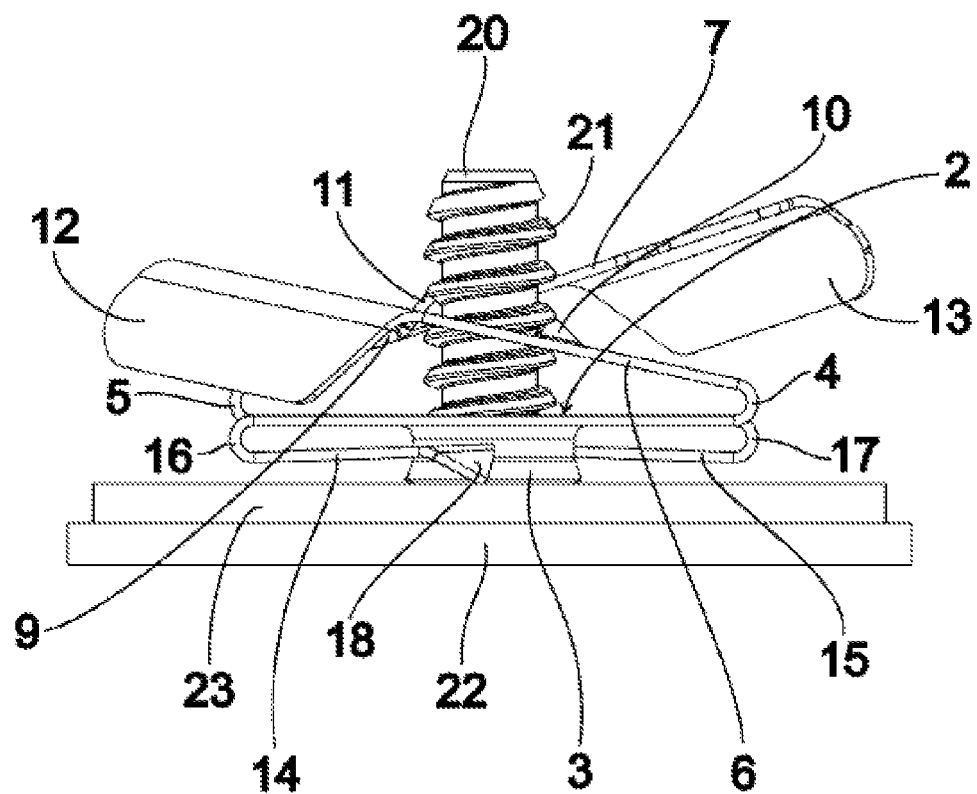
FIG. 3 is a side view of a modification of the exemplary embodiment according to FIG. 1 in an arrangement according to FIG. 2.

FIG. 3 shows a modification of the exemplary embodiment of a spring clip according to the invention as depicted in FIG. 1 in an arrangement according to FIG. 2, it being noted that like elements in the embodiments of FIG. 1 and FIG. 3 are provided with matching reference numerals and will not be described more closely below. The embodiment according to FIG. 3 comprises a guide sleeve 3 which is configured as longer than the guide sleeve 3 of the exemplary embodiment according to FIG. 1. As a result, the modified edge guide sleeve 3 facing away from the base plate 1 comes into abutment with the add-on part 23 upon relatively little deflection of the spring legs 14, 15 toward the base plate 1, such that a certain sealing effect is achieved.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A spring clip for attachment to a threaded shank provided with an external thread, comprising:
   a base plate including a through-opening;
   two articulated legs joined to said base plate, each articulated leg including first and second free ends spaced form one another, an engaging tongue at said first free end for engagement with the external thread of the threaded shank and a manipulating tongue at said second free end for at least partially releasing an engagement of said engaging tongues with the external thread of the threaded shank, each said manipulating tongue angled with respect to said articulated leg and extending toward said base plate, said manipulating tongues oriented parallel to each other and parallel to a surface tangent to said through-opening, said manipulating tongues also disposed diagonally opposite each other whereby said manipulating tongues are movable linearly with respect to one another with reduced transverse forces and torque; and
   at least one resilient spring leg joined to said base plate and extending from an opposite side of said base plate from said articulated legs.

2. The spring clip of claim 1, wherein said spring clip includes a pair of said spring legs.

3. The spring clip of claim 1, further comprising a pointed claw tongue joined to each said spring leg and extending away from said base plate.

4. The spring clip of claim 1, wherein said engaging tongues are respectively connected to said articulated legs via engaging arms.

5. The spring clip of claim 4, wherein said engaging tongues are angled away from said base plate with respect to the particular engaging arm to which said engaging tongues are joined.

6. The spring clip of claim 5, wherein said engaging tongues are wedge-shaped, and include slanting surfaces directed toward a said articulated leg to which said engaging tongues are joined.

7. The spring clip of claim 1, wherein said base plate is circumferentially closed and comprises a guide sleeve surrounding said through-opening and extending toward said articulated legs.

8. The spring clip of claim 7, wherein a length of the guide sleeve is less than a spring travel of each spring leg along an axial direction through a center of said through-opening.

9. The spring clip of claim 1, wherein said articulated legs are joined to said base plate at bent connecting portions and wherein, for each said articulated leg, said second free end extends outwardly of said bent connecting portion to a greater extent than said first free end.

10. A spring clip for attachment to a threaded shank provided with an external thread, comprising:
    a substantially square base plate including a through-opening and a pair of diagonally opposite corners;
    two articulated legs respectively joined to said base plate at said pair of corners, each articulated leg including an engaging tongue for engagement with the external thread of the threaded shank and a manipulating tongue for at least partially releasing an engagement of said engaging tongues with the external thread of the threaded shank, said manipulating tongues respectively joined to free ends of said articulated legs, each said manipulating tongue angled with respect to said articulated leg, said manipulating tongues oriented parallel to each other and parallel to a diagonal line extending through said pair of diagonally opposite corners, said manipulating tongues also disposed diagonally opposite each other whereby said manipulating tongues are movable linearly with respect to one another and toward said diagonal line with reduced transverse forces and torque; and at least one resilient spring leg joined to said base plate and extending from an opposite side of said base plate from said articulated legs.

11. The spring clip of claim 10, wherein said spring clip includes a pair of said spring legs.

12. The spring clip of claim 10, further comprising a pointed claw tongue joined to each said spring leg and extending away from said base plate.

13. The spring clip of claim 10, wherein said base plate is circumferentially closed and comprises a guide sleeve surrounding said through-opening and extending toward said articulated legs.

14. The spring clip of claim 13, wherein a length of the guide sleeve is less than a spring travel of each spring leg along an axial direction through a center of said through-opening.

15. A spring clip for attachment to a threaded shank provided with an external thread, comprising:

a base plate including a through-opening;

two articulated legs joined to said base plate at respective bent connecting portions, each articulated leg including an engaging tongue for engagement with the external thread of the threaded shank and a manipulating tongue for at least partially releasing an engagement of said engaging tongues with the external thread of the threaded shank, said manipulating tongues respectively joined to free ends of said articulated legs and extending outwardly of a plane defined by said articulated legs, each said manipulating tongue angled with respect to said articulated leg and extending toward said base plate, said manipulating tongues oriented parallel to each other and parallel to a surface tangent to said through-opening, said manipulating tongues also disposed diagonally opposite each other whereby said manipulating tongues are movable linearly with respect to one another with reduced transverse forces and torque; and at least one resilient spring leg joined to said base plate and extending from an opposite side of said base plate from said articulated legs.

16. The spring clip of claim 15, wherein said spring clip includes a pair of said spring legs.

17. The spring clip of claim 15, further comprising a pointed claw tongue joined to each said spring leg and extending away from said base plate.

18. The spring clip of claim 15, wherein said base plate is circumferentially closed and comprises a guide sleeve surrounding said through-opening and extending toward said articulated legs.

19. The spring clip of claim 18, wherein a length of the guide sleeve is less than a spring travel of each spring leg along an axial direction through a center of said through-opening.

* * * * *